(12) United States Patent
Ayyagari et al.

(10) Patent No.: US 7,623,458 B2
(45) Date of Patent: Nov. 24, 2009

(54) SYSTEM AND METHOD FOR PROVIDING INTEGRATED SERVICES ACROSS CRYPTOGRAPHIC BOUNDARIES IN A NETWORK

(75) Inventors: Arun Ayyagari, Seattle, WA (US); Orlie T. Brewer, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 853 days.

(21) Appl. No.: 11/241,207

(22) Filed: Sep. 30, 2005

(65) Prior Publication Data

US 2007/0076599 A1    Apr. 5, 2007

(51) Int. Cl.
*H04L 12/56*    (2006.01)
(52) U.S. Cl. .................................................. 370/235
(58) Field of Classification Search .................. None
See application file for complete search history.

(56) References Cited

U.S. PATENT DOCUMENTS

| | | | | |
|---|---|---|---|---|
| 7,251,218 | B2 * | 7/2007 | Jorgensen | 370/235 |
| 7,274,662 | B1 * | 9/2007 | Kalmanek, Jr. et al. | 370/230 |
| 2002/0181400 | A1 * | 12/2002 | Zheng et al. | 370/235 |
| 2003/0053453 | A1 * | 3/2003 | Ono et al. | 370/389 |
| 2003/0074443 | A1 * | 4/2003 | Melaku et al. | 709/224 |
| 2004/0022191 | A1 * | 2/2004 | Bernet et al. | 370/230 |

OTHER PUBLICATIONS

"A Framework for Integrated Service Operation over Diffserv Networks", IETF RFC 2998, Nov. 2000, pp. 1-29.
"Quality of Service (QoS) Signaling in a Nested Virtual Private Network", IETF RFC 4923, Aug. 2007, pp. 1-36.

* cited by examiner

*Primary Examiner*—Anh-Vu H Ly
(74) *Attorney, Agent, or Firm*—McNees Wallace & Nurick, LLC (57) ABSTRACT

A method for providing network integrated services based ReSerVation Protocol acorss a cryptographic network boundary includes assigning one or more DiffServ forwarding classifications to correspond to IntServ requests for QoS provisioning. A daemon in the QoS Service Provider module signals the QoS upon detecting data packets indicating a DiffServ forwarding class assigned to IntServ QoS requests. In response to the notification, the QoS Services Provider module initiates an RSVP-based request for network resources, and establishes a network path in response to acceptance of the RSVP path request. The data flow comprised of encrypted data is then transmitted over the reserved path. Multiple simultaneous aggregated flows may be provisioned. Path may be reconfigured and resized by the QoS services provider module in response to an overlimit data flow, subject to network resource availability. An ECN bit is returnable from the destination application to signal a problem with the data transmission.

22 Claims, 4 Drawing Sheets

SYSTEM AND METHOD FOR PROVIDING INTEGRATED SERVICES ACROSS CRYPTOGRAPHIC BOUNDARIES IN A NETWORK

FIELD OF THE INVENTION

The present invention is directed to a system and method for routing data traffic on a network, and more particularly, to a system and method for implementing Quality-of-Service (QoS) architecture between a destination address and a source address when the data traffic traverses cryptographic network boundaries.

BACKGROUND OF THE INVENTION

In order to transmit data on a network, it is often necessary to secure the data from unauthorized users and persons who may be actively attempting to intercept the data for illegal or insidious purposes. Government networks transmit sensitive defense information in military applications which, if intercepted, could compromise national security. Commercial networks transmit sensitive financial data and individuals' identification information, for example, which data or information could be used to transfer finds illegally or to misappropriate another person's identity. Since conventional network data packets (or IP packets) do not include inherent data security features, the data on a network is capable of being intercepted or reproduced by unauthorized users such as hackers or criminals. Often, data is communicated between private, secure networks over a network path that is not secure. The Internet, as a publicly accessible medium, is inherently such an unsecured network, yet it is often desirable, and even essential, that secure data networks be linked via the Internet or other exposed networks.

Data encryption techniques are deployed to secure information before sending the information over an unsecured network path. There are many types of data encryption, which form the basis for network security. One example of such an encryption scheme is High Assurance Internet Protocol Encryptor (HAIPE) used by the United States Department of Defense. HAIPE devices incorporate Internet Protocol Security (IPSec), a standard defined by the Internet Engineering Task Force (IETF), to provide encryption security. HAIPE devices provide cryptographic isolation between data in secured subnetwork groups, also referred to as secured security enclaves, and data that is transported across an unsecured network, also referred to as a shared transit network. When the data traffic is encrypted, packet exchanges and IP addresses that appear as readable text in the secured enclaves are converted to cipher text in the shared transit network. Segmentation of the network at cryptographic boundaries between secured enclaves and shared transit network nodes interferes with Quality of Service (QoS) mechanisms that require specified signaling messages to be exchanged between peer network elements to provide certain enhanced data transport services. The QoS architecture is discussed in greater detail below. In particular, QoS mechanisms, which provide the ability to reserve capacity on a network and establish a predetermined route between source and destination nodes, depend on information from data packets. Such encrypted data packets, however, cannot be deciphered by the shared transit network nodes.

The QoS architecture enables performance assurance and service differentiation in data networks. For example, video-conference transmissions may require a specified bandwidth over a continuous time interval, to provide the necessary video and audio quality, whereas sending a webpage to a network terminal requires less bandwidth and no defined time interval in which to reach the destination. These QoS architecture functions can be broadly classified as resource allocation and performance management. Allocation of network resources, such as routing devices and bandwidth, is necessary to ensure that the QoS requirements of various data traffic flows are satisfied. The QoS performance management aspect is to determine and establish the network path that each traffic flow should take, to optimize the number of user application sessions whose QoS requirements have been satisfied and to optimize the utilization of network resources.

Some data security standards, such as HAIPE, restrict the packet header information that can be exchanged between secured enclaves and shared transit network nodes, the shared transit network being separated from the secured enclaves by cryptographic boundaries. The packet header information that is permitted to cross a cryptographic boundary allows the sender from the secured enclave to specify a service level, e.g., expedited forwarding, assured forwarding, and "best efforts", which are commonly-known forwarding behaviors. However, in the HAIPE-compliant network there is only limited provision capability for the application to communicate with the shared transit network node regarding QoS service levels such as path reservations and resource allocation for particular data flows. Further, there is no level of service assurance in the HAIPE environment, i.e., if the nodes in the shared transit network enter a load shedding state, the source of the data transmission is not notified of this condition. The source application is not explicitly aware that the requested service level was not provided by the network. If the network itself changes state and is unable to meet the cumulative data traffic loads admitted by the ingress traffic devices, neither the ingress traffic routers, nor the client applications, are informed of the failure to maintain the associated service quality. Consequently an application that is attempting to establish a flow of data traffic with a predetermined level of network service may not be aware whether a particular service state is being delivered to the application.

Thus, there is a need for a method of enabling QoS features that permit the reservation of resources on a data network with encryption boundaries, and provide a response from the destination verifying receipt of the data flows specified by the source application.

SUMMARY OF THE INVENTION

The present invention is directed to a method of enabling Quality of Service (QoS) characteristics for transmitting encrypted data packets across a shared transit network. The method comprises selecting an unencrypted field in a header of an encrypted data packet to receive a QoS request, the unencrypted field relating to packet forwarding information; assigning at least one traffic forwarding classification of the packet forwarding information to indicate a QoS request from a software application; inserting at least one QoS request into the unencrypted field before encrypting the encrypted data packet; monitoring the headers of a plurality of encrypted data packets of at least one data flow to detect for encrypted data packets including at least-one of the assigned traffic forwarding classifications corresponding to a QoS request; signaling an administrative network module in response to detecting an encrypted data packet of the at least one data flow having the assigned at least one traffic forwarding classification corresponding to a QoS request; establishing, for the at least one data flow, a network path from a source network address to a destination network address with the administrative network module, the network path having at least one node compatible with QoS characteristics associated with the assigned at least one traffic forwarding classification; reserving the network path for subsequent transmission of the at least one data flow; and transmitting the plurality of encrypted data packets of the at least one data flow to the destination network address; monitoring the at least one data flow for compliance with one or more QoS characteristics associated with the QoS request. Establishing a network path also includes establishing a plurality of subdivisions of the network path for transmission of more than one data flow, each of the network path subdivisions having predetermined parameters, and wherein monitoring also includes monitoring each of the data flows for compliance with one or more QoS characteristics associated with the QoS request.

The invention is also directed to a system for enabling Quality of Service (QoS) characteristics for transmitting encrypted data packets across a shared transit network. The system comprises a plurality of secured network enclaves coupled by a network. The plurality of secured network enclaves have a first security level and the network has a second security level different from the first security level. A cryptographic boundary separates each secured network enclave and the network.

A crypto device is disposed along the cryptographic boundary of each secured network enclave, the crypto device being configured to permit data communication between the network and the secured network enclave.

A means is provided for mapping at least one integrated services request to at least one packet forwarding classification in a packet to be forwarded by a software application in a secured network enclave. Each crypto device includes an encryption/decryption means for encrypting and decrypting a data flow, a classification monitoring module and a service provider module. The classification monitoring module includes detecting means for identifying the at least one packet forwarding classification mapped to the at least one integrated services request in a data flow from a first software application within a first secured network enclave and notifying means for notifying the service provider module of the receipt of the at least one integrated services request by the monitoring module. The service provider module is configured for communicating at least one path reservation request associated with the at least one integrated services request across the network, for generating at least one reserved path across the second-level network in response to the at least one integrated services request, and for transmitting at least one data flow to at least one peer software application in a second secured network enclave from the first software application in response to generating at least one reserved path across the network.

It is an advantage of the present invention to exploit the allowed exchange of forwarding classifications-i.e., DiffServ Code Point (DSCP) and Explicit Congestion Notification (ECN) bits—across a secured network enclave to shared transit network boundary, and the allowed exchange of ECN bit across a shared transit environment to a secured network enclave boundary.

Another advantage of the present invention is the ability to provide QoS features between secured enclaves across a shared transit network, without additional control signaling exchange to the shared transit network.

Yet another advantage of the present invention is the ability to resize the aggregated session resource allocations within the shared transit network.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
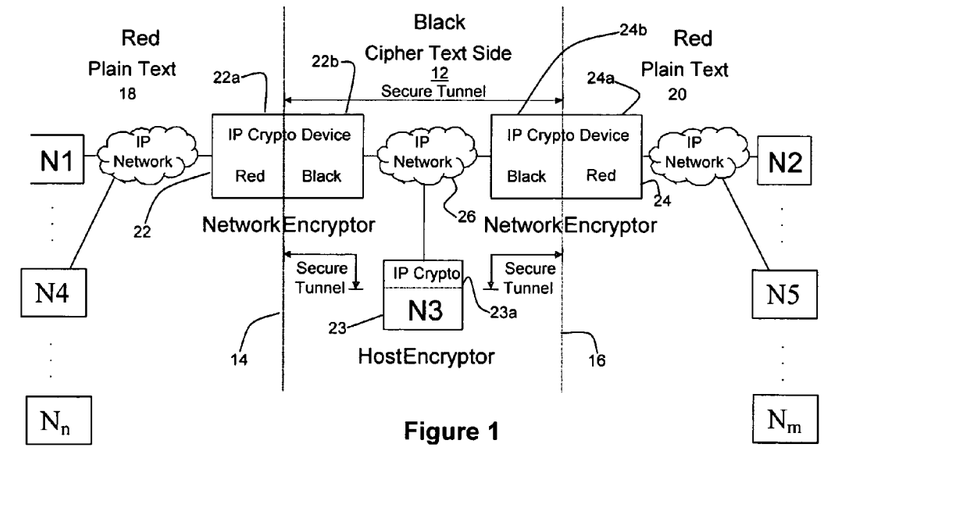
FIG. 1 shows a topology for an exemplary information security network using the method of the present invention.

Referring to FIG. 1, a topology 10 for an information security arrangement is illustrated. A secure tunnel 12 is defined by cryptographic boundary lines 14 and 16 that segregate the secure tunnel 12 for data security purposes from network security areas 18 and 20 disposed on either side of security tunnel 12. The security areas 18, 20 are also referred to as plain text sides with respect to boundaries 14, 16, meaning that within each security area 18, 20, a common security level is shared by all users. Within a security area 18, 20, encryption of data is not required, because the security area is protected from unauthorized intrusion by, for example, physical isolation or firewalls. Thus, for example, nodes within security area 18, designated as N1 and N5, may exchange data freely in security area 18 without having to encrypt the exchanged data, and nodes within security area 20, designated as N2 and N4, may exchange data freely in security area 20 without the need for encryption. However, in order for nodes N1 or N5 to communicate with nodes N2 or N4, it is necessary to transmit data across cryptographic boundaries 14 and 16. While all four nodes N1, N2, N4 and N5 share a common security level, it is necessary to encrypt the data prior to allowing the data to cross cryptographic boundaries 14, 16, and traverse the nodes or network devices of the IP Network 26 within the secure tunnel 12. Depending on the source and the destination of the data that is being transmitted, such data is encrypted at a boundary ingress device 22 and decrypted at a network egress device 24. In the example shown, it is assumed that the source application is transmitting the data from node N1 located in security area 18 and to destination node N2 located in security area 20. The ingress 22 and egress 24 devices would be reversed if the source and destination nodes were reversed. Ingress device 22 includes a red or plain text side 22a and a black or cipher text side 22b IP cryptographic interface that defines the cryptographic boundary 14. Similarly, the egress device 24 includes a red or plain text side 24a and a black or cipher text side 24b IP cryptographic interface that defines the cryptographic boundary 16.

Integrated services (IntServ) describes a networking architecture that specifies the parameters for the desired level of services required of the network for a data flow that is being transmitted under QoS. The IntServ parameters specify the network resources to be reserved for each data flow. A software application must make an explicit reservation of network resources from a source address, to a peer application at a destination address. The software applications are QoS-aware, or include an add-on module for implementing QoS. The network resources must establish the reserved path prior to transmitting the data traffic across the network. The application initiates the reservation by specifying the resource requirements of the data flow from the source address, across the network to the associated application at the destination address. If the network has sufficient resources to satisfy the application data flow requirements, the application reservation setup is established. The network denies requests for reservations where resources are insufficient to accommodate the requested data flow parameters. After the network path is configured, the source application transmits its data packets or flow to the peer destination application. Note that the flow reservation is established one-way, e.g., resource allocation occurs at the source applications initiating the resource reservation setup to its peer destination application. If bi-directional resource reservation is required then each application would have to initiate the resource reservation to its peer application. As will be discussed in further detail below, resource allocation generally occurs from the source application to the destination application, or "end-to-end", unless otherwise indicated.

Figure 2:
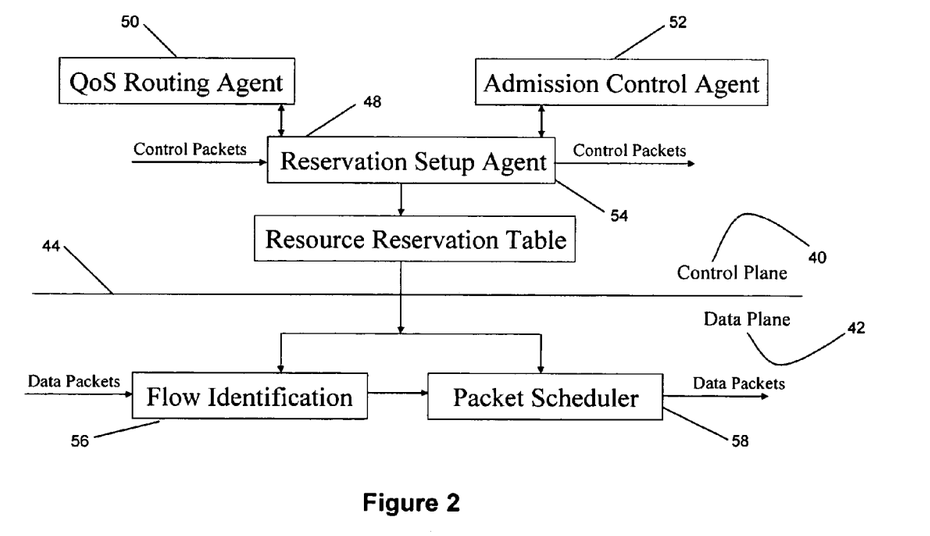
FIG. 2 is a reference model of the Integrated Services Architecture including a control plane and a data plane.

Referring to FIG. 2, the IntServ reference diagram 100 includes a control plane 40 and a data plane 42. The control plane 40, designated as the control elements above line 44, establishes resource reservations for a data flow, while the data plane 42 forwards data packets based on the established resource reservation for the associated data flow. When a network router or device receives the request to initiate a resource reservation for a data flow, the reservation setup agent module 48 determines the next network device (or "hop") to which the resource reservation request should be forwarded by querying the QoS routing agent module 50. Following this, the reservation setup agent 48 coordinates with the admission control module 52 to determine whether the network resources are sufficient to satisfy the service level request. A resource reservation table 54 is updated with a new data flow path 60 (see, generally, FIG. 3) and reservation state after the flow path 60 has been established. The new flow path 60 and reservation state contains the QoS parameters associated with the particular data flow. The information contained in the resource reservation table 54 is used to configure a flow identification module 56 and a packet scheduler module 58 in the data plane 42. When data packets arrive, packets belonging to the configured data flows are directed into predetermined queues. Subsequently the packet scheduler 58 allocates the network resources and schedules the transmission of the queued packets based on the information provided in the resource reservation table 54.

One aspect of the IntServ protocol is that of reserving the network resources along a data path extending from the source application, through connected nodes of the network, to a destination application. One such networking protocol is described as Resource ReSerVation Protocol (RSVP), which is described in RFC 2205 (Braden et al., "Resource ReSerVation Protocol (RSVP)", 1997). RSVP is a protocol by which a software application requests QoS from the network for data flows which require predetermined transmission parameters from end-to-end. RSVP signals incorporate semantics from the integrated services protocol to convey QoS requests to the network. The RSVP signals to the network devices information regarding traffic aggregates, and requirements for services beyond the traditional guaranteed and controlled load services.

RSVP messages include PATH and RESV messages. Transmitting applications or senders send PATH messages to receiving applications or receivers to describe the data that will be transmitted and to indicate the path over which the data will be transmitted. Receivers send RESV messages that follow the reverse path followed by the PATH messages to the senders, and indicate the parameters for data flows that particular network receivers may accommodate. In the case of multicast traffic flows, RESV messages from multiple receivers are merged. RSVP messages include classification information for the data flow, quantitative parameters for bandwidth and delay which describe the data flow, end-to-end service discipline for data flow, and policy information, e.g., the user requesting network resources and the application that is the source of the data flow.

Figure 3:
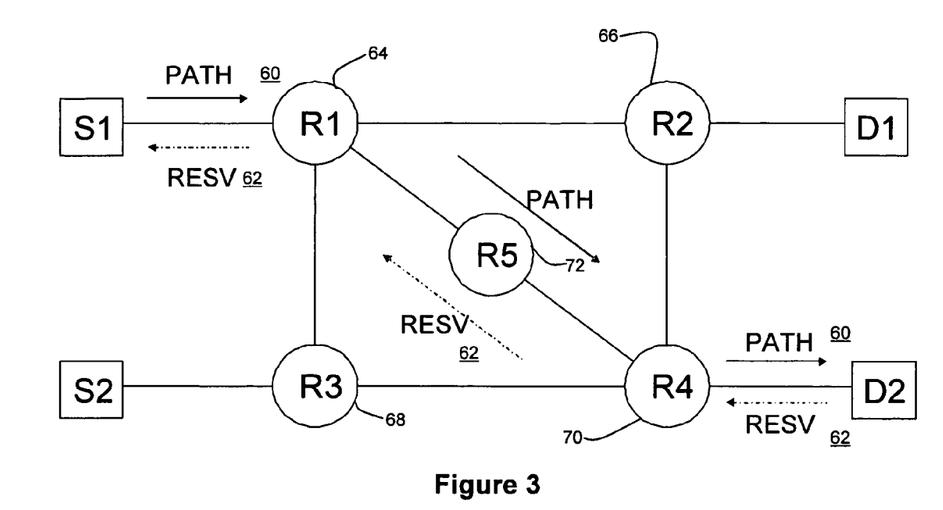
FIG. 3 is a diagram of a communication path using ReSerVation Protocol RSVP session.
Figure 4:
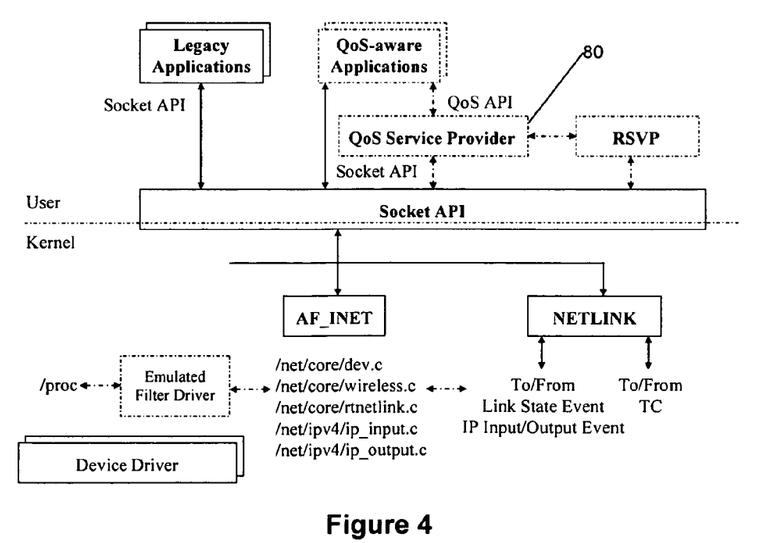
FIG. 4 is a diagram of the QoS management architecture.

Referring to FIG. 3 PATH messages 60 traverse all network devices R1-R5, designated as 64-72, from sender S1 to receiver D2. Devices in the data path having RSVP capability, for example, R1 and R4, note the PATH messages 60 and establish a resource path state for the flow described by the message. Devices without RSVP capability, for example, R5, forward the messages transparently along the path. When PATH message 60 arrives at receiver D2, the receiver D2 sends a RESV message 62 responsive to the PATH message 60, if the receiving application indicates acceptance of the data flow that is being transmitted by sender S1. The RESV message traverses the network nodes (in this example, 70, 72 and 64) back towards sender S1 over the network path 60 established by the incident PATH message 60. As the RESV message 62 progresses toward the sender S1, RSVP enabled network devices, for example, R4 (70) and R1 (64), verify that they have the resources sufficient to meet the QoS parameters communicated from sender S1. If a network device can accommodate the resource request, the device installs a resource reservation state corresponding to the flow and allocates resources sufficient to handle the expected data flow. The network device forwards the RESV message 62 to sender S1. If a network device cannot accommodate the resource request, the RESV message 62 is rejected, which rejection is communicated back to the receiver D2.

RSVP enabled devices R1-R4 (64-70) in the data path may extract policy information from PATH messages 60 and/or RESV messages 62, for verification of compliance with network policies. Devices may reject resource requests based on the results of these policy compliance verification checks, by preventing the message from continuing on its path, and sending a rejection message. When requests are not rejected, the incident PATH message is transmitted from sender to receiver, and a RESV message is transmitted in return, establishing a resource reservation. An established resource reservation indicates that RSVP enabled devices in the data path are prepared to allocate these resources to traffic belonging to the flow and have committed the requested resources.

Data flows traversing the cryptographic boundaries 14 and 16 are encrypted to secure data fields, including IntServ parameters. Thus, IntServ parameters are unavailable to the network devices within the secure tunnel 12 for the purpose of establishing RSVP paths and QoS levels, e.g., bandwidth and traffic aggregates. However, the differentiated services (DiffServ) field of the IP packet header explained in detail below, is permitted within data encryption standards, e.g., HAIPE, IPSec, to be transferred unencrypted across cryptographic boundaries 14 and 16. In order to take advantage of the QoS features discussed above, the differentiated services field is converted to a code that corresponds to parameters in the encrypted IntServ field, as follows.

Figure 5:
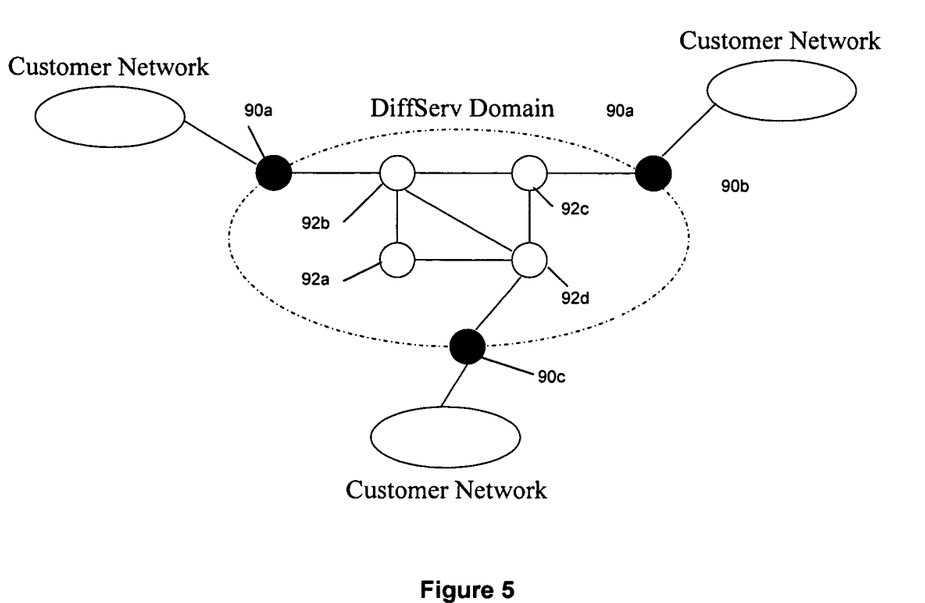
FIG. 5 is a diagram of a differentiated services network arrangement.

DiffServ classifies packets into a small number of forwarding classes corresponding to aggregated data flows. Typically, DiffServ addresses a single domain for providing QoS guarantees via service level agreements (SLA), without providing reserved network resources such as is accomplished through RSVP. Referring to FIG. 5, a network configured for DiffServ services consists of nodes 90a-90c at the boundary of the network called "boundary nodes" and nodes 92a-92d within the network called "core nodes" as illustrated in FIG. 5. Data traffic in a DiffServ domain is grouped into a small number of forwarding classes. Data packets associated with a forwarding class adhere to a predefined forwarding treatment in terms of traffic prioritization and bandwidth allocation. Packets are classified by setting the differentiated services (DS) field within each data packet IP header. The DS field byte includes 8-bits, a 6-bit differentiated services code point (DSCP) and a two-bit traffic congestion code referred to as explicit congestion notification (ECN). The DSCP bit specifies the packet forwarding behavior for a flow aggregate at each node. The parameters of the DSCP bit specify differentiation of queuing data for each data traffic class, and a desired bandwidth reservation. The packet forwarding behavior may define a statistically guaranteed minimal bandwidth, or a fraction of the available bandwidth for a given forwarding class.

Standardized packet forwarding behaviors are defined as expedited forwarding (EF) and assured forwarding (AF). EF forwarding behavior is defined as a forwarding treatment for a given traffic aggregate such that the network guarantees a configured outgoing rate independent of other queued outgoing traffic from the node. The network devices preempt other queued outgoing traffic to accommodate EF data traffic within the requested limits, guaranteeing low packet loss and latency. AF forwarding behavior specifies four forwarding classes. The four AF forwarding classes are further configured to specify three priority levels within each forwarding class. The three priority levels associated with each AF class determine which packets within a given forwarding class should be dropped during periods of traffic congestion or when aggregate flow exceeds allocated resource levels.

An AF forwarding class is independent of other AF forwarding class specification. Packets must be forwarded strictly according to the drop priorities within each AF forwarding class. However, nodes may reorder packets from one AF forwarding class to another while ensuring that boundary nodes do not split traffic from the same application source into different forwarding classes.

Figure 6:
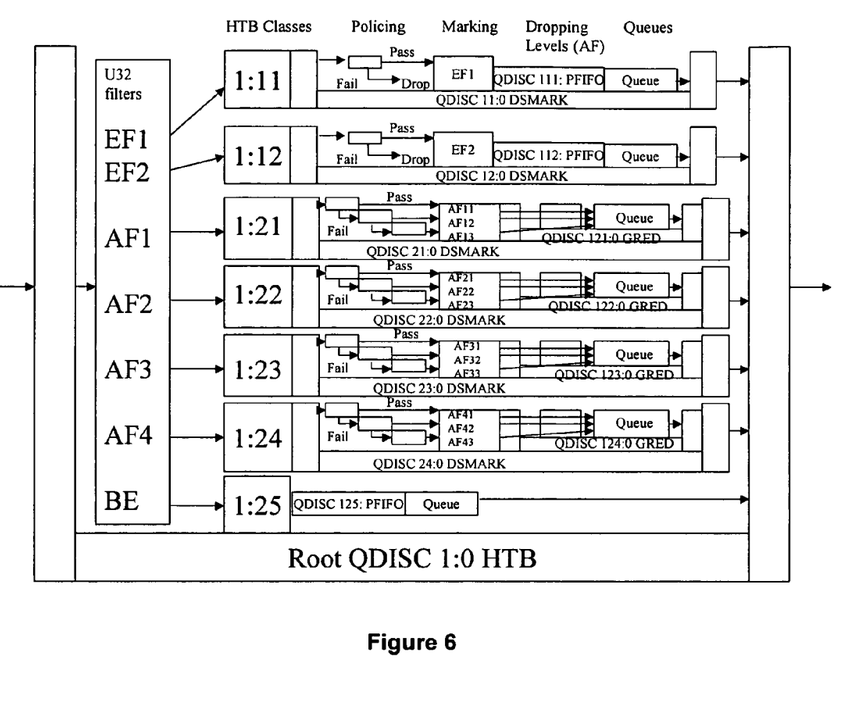
FIG. 6 is a diagram of differentiated services forwarding classes and priority classifications in a Linux embodiment of the present invention.

Referring next to FIGS. 1-5, IntServ values are mapped (or assigned) to one or more subsets of the differentiated services code point DSCP. FIG. 6 shows one example of a DiffServ implementation using Linux TC elements. For example, assured forwarding class AF4 has three subclasses AF4-1, AF4-2 and AF4-3. The IntServ parameters of a data flow are assigned to the three AF4 subclasses. Note that this assignment may vary, i.e., AF1, AF2 or AF3 forwarding classes, or combinations thereof may be utilized. A packet monitor (not shown) within the QoS Service Provider module 80 kernel mode space is disposed at a network ingress node 22. When a data flow having a DSCP value corresponding to IntServ requests i.e., AF41, AF42 or AF43 is transmitted to the ingress node 22, the monitor detects the DSCP values corresponding to IntServ parameters and notifies the QoS Service Provider module 80 that IntServ QoS services are being invoked by the source application.

The monitor provides the QoS Service Provider module 80 with the DSCP value, source IP address and destination IP address of each individual data packet in a data flow. The source IP address indicates to the QoS Server Provider module 80 whether the network node is an ingress node following the boundary node, or an intermediary node within the secure tunnel. The destination IP address and DSCP value are parameters used by the QoS Service Provider module 80 to initiate the RSVP session to a receiver node 24 disposed at the cryptographic boundary 16 of the secure tunnel 12. When the QoS Service Provider module 80 establishes the requested service, e.g., the path having the requisite bandwidth for the identified data flow, the data flow is transmitted between the boundaries 14 and 16 in the secure tunnel portion of the network. At the egress node 24, the data packets in the data flow are decrypted, and the data packets transmitted to the destination node N2 as plain text or unencrypted data fields.

Multiple flows may be initiated simultaneously by the QoS Service Provider module 80 at the ingress node 22. The number of flows may be limited, e.g., by configuring an initial default array size to a finite number of DSCP values, i.e., the number of data flows that may be provided with QoS capability across a secure tunnel 12 of the network. If the default array size has a default value of 10, for example, then the limit of data flows monitored by the QoS Service Provider module 80 at ingress node 22 would be 10.

In the data plane 42, flow identification module 56 is associated with the QoS Service Provider module 80 at the ingress node 22. The flow identification module 56 monitors the data flow for compliance with network policies, e.g., whether the data flow equals, exceeds or is less than the bandwidth originally requested and allocated by the network. The flow identification module 56 periodically measures the traffic flow for changes in the traffic flow parameters. If after a predetermined number of iteration intervals the data flow remains insignificant, flow identification module 56 notifies the QoS Service Provider module 80, and the RSVP session is terminated by the QoS Service Provider module 80. The iteration interval is dynamically or statically configurable, e.g., a thirty-second period for an iteration would cause a termination of the RSVP session if negligible traffic flow was detected over a ninety-second interval. The flow monitor resets the DSCP monitor to allow a new RSVP session to be established.

The QoS Service Provider module 80 establishes the RSVP session or sessions. The flow identification module 56 monitors the flow parameters at the ingress node 22. When the data is received at the egress node 24, as discussed above, the data is decrypted and forwarded to the destination. To comply with HAIPE encryption standards, the DSCP field is not permitted to be exchanged across an ingress node 24 at a boundary 16 from the black side 24b to the red side 24a of an ingress node or IP crypto device 24. The HAIPE standard currently allows 6-bit DSCP and 2-bit ECN DiffServ data to be exchanged across a red/black boundary, and only 2-bit ECN to be exchanged across a black/red boundary. In this aspect of the invention, it is advantageous to provide confirmation from the application at the destination IP address to the application at the source IP address, that the data flow transmission was successful. There are multiple means by which to communicate such confirmation from the destination to the source. One embodiment of the invention uses the ECN bits of the DS field for signaling congestion across the cryptographic boundary from the black-side 22b to the redside 22a. In addition, QoS Service providers on the red-side, i.e., 22a and 24a are capable of each monitoring the data traffic flows and interchange the monitored data traffic flow state for an ingress red-side, i.e., 22a, to determine whether the QoS provisioning requirements for a given traffic flow being met. The present invention utilizes the ECN bits that are associated with the differentiated services field as one source of confirming receipt of the transmitted data according to the data flow parameters. Encryption standards permit ECN bits to be exchanged across cryptographic network boundaries in both directions—e.g., red to black and black to red—at both the ingress nodes 22 and the egress nodes 24. The destination IP address is capable of communication back to the source IP address when network congestion is adversely affecting the transmitted data flow. If the ECN bit indicates a problem with the data flow reception—i.e., the ECN bit is set at 1—the RSVP session may be dynamically reconfigured to accommodate the data flow, particularly where multiple data flows are transmitting along parallel network paths.

An example of the operation of the present invention is now described. In this example, three data flows are established, each of which have invoked QoS capabilities from a secure area 18 of the network 10, through the IntServ-based QoS provisioning mechanism. The IntServ-based QoS provisioning in turn is mapped to three of the DiffServ classes in the DSCP field to alert the monitor in the QoS Service Provider module 80 kernel mode space of the network stack to initiate three separate RSVP sessions traversing the secure tunnel 12. For simplicity, it is assumed that all of the paths (P1-P3) have specified equal bandwidth for the data flow—e.g., 384 Kbps, for transmitting three simultaneous video teleconferences—from the network resources. The flow identification module 56 monitors each of the three data flows at predetermined intervals, to ensure that the actual data flow is within the specified QoS parameter, in this case, not exceeding 384 Kbps. The flow identification module 56 will also determine when a data flow is significantly less than the specified QoS parameter, or in this example, when the data flow drops off to a low level—e.g., 128 Kbps—for a predetermined interval. As described above, the interval at which the QoS Service Provider module 80 checks the flow identification module 56 values may be statically or dynamically configured based on a variety of considerations. A very short interval may cause the flow monitor to reconfigure the aggregated traffic flows too frequently, causing instability in the network resources, i.e., hunting. Conversely, a long interval may result in inefficiency in the network resources, due to a long interval of non-utilization by the data flow. In one embodiment of the invention, the flow-monitoring interval may be approximately 30 seconds, but longer or shorter intervals may be used as appropriate for the data flow type. In the current example it is assumed that the data flow monitor checks the data flow at 30-second intervals. If, after a first 30-second interval, a first path P1 is exceeding the allocated bandwidth by 384 Kbps, the QoS Services Provider attempts to temporarily "borrow" available bandwidth from the aggregated flow path reserved for the remaining DiffServ forwarding classes (AF1, AF2, and AF3), since the excess data flow may be transient in nature. Assuming that all paths P1-P3 and DiffServ forwarding classes are not using the full allocated bandwidth, the excess (or offending) data flow may normally be accommodated for the transitory period of excess traffic. If the borrowed capacity is needed by the path originally designated for the traffic, the packet scheduler 58 will begin to drop packets according to a priority algorithm or scheme. After a second interval, if the flow parameter continues to exceed the allocated bandwidth, the QoS Service Provider module 80 continues to use available bandwidth allocated across the remaining DiffServ forwarding classes, AF1, AF2 and AF3, according to the policies instituted by the QoS Service Provider module 80. After a third interval wherein the bandwidth continues to exceed the bandwidth, the flow identification module 56 causes the QoS Service Provider module 80 to attempt to resize the bandwidth for the RSVP session or sessions. If the QoS Service Provider module 80 is able to negotiate for expanded bandwidth, then the multiple RSVP sessions may be accommodated, or else the session bandwidth remains as originally allocated.

The QoS Service Provider module 80 responds to the flow identification module 56 after the third policy violation interval in one of two ways: 1) dynamically resize the paths or 2) reclassify the offending data packets. In the first case, the QoS Service Provider module 80 determines the aggregate data flows between the three RSVP reserved paths. If any of the remaining two paths P2 or P3 has available capacity—i.e., is using less than its allocated bandwidth—the QoS Service Provider module 80 allows that excess bandwidth to be used for the P1 data flow. If the aggregated traffic is within the total allocated resources, the parallel data flows may continue as reconfigured. If the borrowed capacity from the underutilized path is needed by that path at a later iteration of the data flow monitor, or if the first path P1 is no longer exceeded, the data flows are returned to their normal allocation.

The QoS Service Provider module 80 can dynamically also reconfigure (i.e., resize) the data flow paths P1-P3 to conform to the traffic profiles for each path. In such a case, the high traffic flow path can be increased, and the lighter traffic flow path decreased, rather than borrowing the allocated bandwidths for short term overloads as discussed in the preceding paragraph. If after another iteration interval, which may also be dynamically configurable, the traffic flows have changed, the flow paths may be reconfigured by the QoS Service Provider module 80 as needed. Resizing the data flow paths differs from "borrowing", as discussed in the preceding paragraph, in that resizing is an attempt to update the resource allocation for a given flow on a long-term basis. "Borrowing" of bandwidth from the neighboring flow paths is done on an immediate basis when a given flow exceeds its allocation and there is unused capacity within the given node that the particular forwarding class or data traffic flow can use for a predetermined interval. Should other alternate QoS provisioning flows begin using their full bandwidth allocations and there no unused capacity exists at the given node, then the data flow that exceeds its bandwidth allocation will experience packet loss to bring the data flow within its bandwidth allocation. Thus, "borrowing" is an immediate solution to overcome transient surges in data flow rates, while "resizing" is a means to ensure that bandwidth allocations are updated to reflect long term demands of the given data flow.

The QoS Service Provider module 80 may optionally configure a percentage of the reserved resource band—e.g., one percent—dedicated to control signaling. This relatively small percentage of bandwidth will generally take priority of transmission over other forwarding classes.

If the ECN bit notifies the source application of congestion, the QoS Service Provider module 80 may reconfigure the RSVP session or sessions by negotiating for more network resources. Further, the destination application can communicate across the control plane through the shared transit network 26 to the source application located in a secure network 18, to notify the source when the transmission parameters for the RSVP session are not consistent with the actual data flow received by the destination application.

Referring again to FIG. 1, N3 represents a single node 23 that includes a host encryptor, the node 23 being directly connected to the IP network 26 through a cryptographic device 23a in the secure tunnel 12, instead of being connected through a secure network as in security areas 18, 20. Thus N3 may transmit encrypted data to either N1 or N2 through the shared transit, i.e., black, network 26, via IP cryptographic device 23a.

The IntServ implementation of the present invention that operates across the cryptographic boundary is constructed on a dynamic DiffServ network QoS management framework. The IntServ implementation in this aspect of the invention provides for individual RSVP-based IntServ sessions on the security enclave 18 to be aggregated into one or more dynamically instantiated RSVP-based IntServ sessions. The RSVP-based IntServ sessions are instantiated between the ingress 22b and egress 24b nodes within the secure tunnel 12. The IntServ implementation uses policy based management whereby the RSVP daemon on the ingress black node 22b monitors the DSCP values on the outbound ports of the security enclave 18 to initiate the creation or deletion of aggregated RSVP-based IntServ sessions to the appropriate egress black node 24b. This method provides end-to-end IntServ across cryptographic boundaries 14,16. The DSCP values that invoke RSVP signaling within the secure tunnel 12 are based on policies that ensure consistent classification and policing within both red security enclaves 18,20 and the black secure tunnel 12. The end-to-end QoS provisioning functionality is enhanced by utilizing the ECN byte across red/black boundaries and traffic monitoring on the egress/ingress red boundaries to dynamically resize the aggregated RSVP-based IntServ session's resource allocations within the secure tunnel 12.

As an example, HAIPE encryption environment includes IPSec (tunnel mode with Encapsulating Security Payload (ESP)) on a stand-alone Linux machine running the kernel version 2.6. This HAIPE device does not execute the code for the QoS Service Provider module 80 or RSVP daemon, but merely simulates the HAIPE encryption functionality. Each HAIPE device has two interfaces, one red and one black. The IPSec is configured so the red network is hidden from the black network. All red traffic on the black network is (ESP) encrypted and carries the source and destination IP addresses of the black interfaces of the simulated HAIPE devices.

Figure 7:
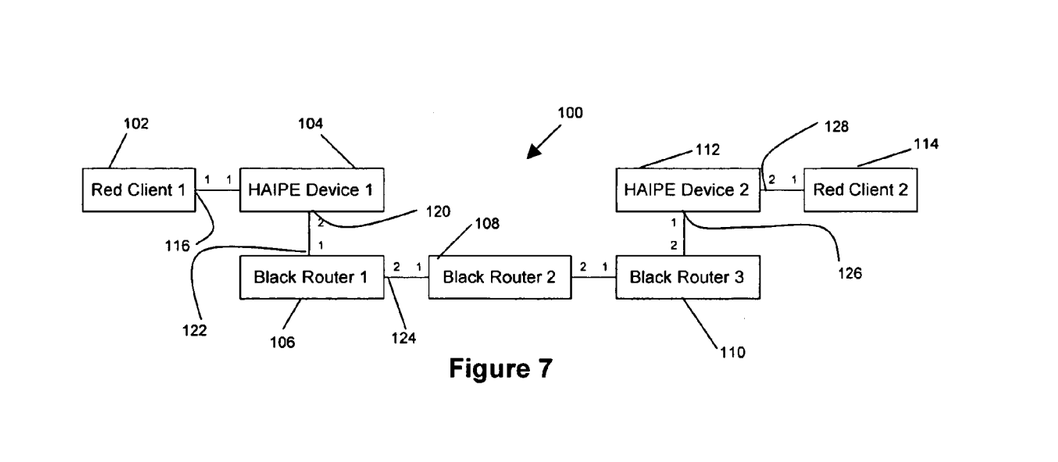
FIG. 7 is an exemplary network implementation of the present invention.

FIG. 7 illustrates an example of a simple network deploying the IntServ implementation of the present invention. The network 100 consists of seven network devices 102-114. The interface 116 of a red client device 102 is connected to the same subnet as the red interface 118 of HAIPE device 104. The black interface 120 of the simulated HAIPE device 104 is connected to interface 122 in the first black router 106. The second interface 124 of black router 106 is connected to an intermediate black router 108, which is also connected to the third black router 110 in the network path. Black router 110 is connected to the black interface 126 of the second HAIPE device 112. The red interface 128 of this HAIPE device 112 is connected to a second red client 114. It is noted that the above disclosed configuration is an exemplary configuration and that the method of the present invention will be operable with various operating systems (e.g., Windows, Unix) know to those skilled in the art. Similarly, the number and types of network devices and their arrangement may vary.

The kernel is configured to detect packets with a source IP address of the HAIPE device 104 being routed to an interface 122 connected to the black network with DSCP values of any of the three packet forwarding priority levels i.e., pass, delay and drop, corresponding to the AF class reserved for RSVP traffic. The network QoS management of the present invention configures a specific AF class for RSVP traffic and the DSCP value is copied through the IPSec encryption. The first black router 106 between the HAIPE device 104 and the black network is thus notified of RSVP traffic.

The QoS Service Provider module 80 configures a black-side RSVP session between the first black router 106 and the last black router 110, in response to a signal from the kernel indicating packets carrying the IntServ-assigned DSCP values. This RSVP-session requires a connection table comprised of black-router/HAIPE-device connections. The connection table indicates to the QoS Service Provider module 80 which black router serves as an RSVP endpoint when it has a simulated HAIPE device destination address. Also, all intermediate black routers may access the connection table in order to configure the black-side RSVP session. In order to set up the traffic control (TC) filters, the black network devices require the simulated HAIPE device IP addresses, since IP addresses between the first black router 106 and the last black router 110 are contained in the IP packet headers. Note that if the HAIPE encryption were such that the source IP address is the first black router 106, then this table would be unnecessary. The QoS Service Provider module 80 also tears down this black-side RSVP session when there are no packets flowing through that TC filter for a certain amount of time.

In order for the kernel to detect and report packets with a certain source IP address and DSCP value, the kernel is modified to extend the rtnetlink, used within the kernel to communicate between various subsystems and for communication with user-mode space programs, by adding the message types for a new QoS session, deleting a QoS session, and obtaining a QoS session, by adding a broadcast group and by defining the QoS message structure in the operating system. The processing function for these message types is added in the operating system [e.g., /usr/src/linux/net/core/rtnetlink.c]. When a QoS-aware application sends a new QoS message to the kernel, for a particular interface, the message includes a DSCP value and a source IP address and the processing function stores these values in an array. In one embodiment, a static array of 10 was configured, although more or less values may be configured. Further, the array size may be dynamically configured, if desired. The array is scanned whenever a packet is being forwarded. If there is a match, the system saves the destination address in another static array of predetermined size, e.g., 10 values, so that it will not report this match again. The kernel then reports the interface, DSCP value, source IP address and destination IP address to the broadcast group.

A QoS-aware application may reset the monitoring of that DSCP value from the source IP address to the destination IP address by sending a new QoS message to the kernel with those values. Sending a new QoS message with a DSCP value and source IP address, and without a destination address, resets the monitoring of that DSCP value and source IP address combination to all destination addresses. Sending a delete QoS message to the kernel with a DSCP value and source IP address, removes that combination from the array.

The QoS Service Provider module 80 on any red client merely ensures that the DSCP value is set to the appropriate AF class reserved for RSVP. In order to inform the QoS Service Provider module 80 which DiffServ AF class to use for RSVP traffic, a class directive in the QoS Service Provider's configuration file is used, as in RSVP_CLASS AF4. This is typical for all interfaces throughout the network environment on both the red side and the black side.

These entries are the same for all black routers in the environment. The QoS Service Provider module 80 reads the configuration file and retrieves the IP address of all network interfaces. If any of the interface IP addresses are in the black-router-to-HAIPE-device table, they are designated as local addresses.

For black routers connected to simulated HAIPE devices and the black network, it is necessary to indicate to the QoS Service Provider module 80 which network interfaces are connected to the black network. The notification directive in the QoS Service Provider module 80 configuration file is used to inform the QoS Service Provider module 80 that an interface is connected to the black network and that inform the QoS Service Provider module 80 to scan other interfaces for encrypted RSVP traffic coming from other network devices connected to simulated HAIPE devices.

If the QoS Service Provider module 80 sees the notification directive for an interface when reading the configuration file of that interface, it designates that interface as one to monitor. For each interface so designated, the QoS Service Provider module 80 scans the black-router-to-HAIPE-device table. For all local connections in the table, it sets the kernel to monitor packets being routed to that interface from the IP address of the simulated HAIPE device with DSCP values of the three levels of the AF class reserved for RSVP.

The QoS Service Provider module 80 configures a listening API on a predetermined port, e.g., 9999, with the RSVP daemon, on any interface connected to a simulated HAIPE device.

Whenever, the kernel notifies the QoS Service Provider module 80 that it has detected a packet with a certain DSCP, source IP address, and destination IP address, the QoS Service Provider module 80 scans the black-router-to-HAIPE-device table and attempts to setup an RSVP session between another port, e.g., 9998, on itself and port on the black router, e.g., 9999, in the table corresponding to the destination IP address. When the RSVP PATH message is received by the last black router, it is forwarded to the QoS Service Provider module 80, which initiates the generation of an RSVP RESV message. At each black router along the return path, if the session is accepted and if the ports are 9998 and 9999, the QoS Service Provider module 80 consults the black-router-to-HAIPE-device table to extract the simulated HAIPE device IP addresses to create a TC filter. When the original black router receives the RSVP RESV message and has created the TC filter, it begins to monitor the filter. The RSVP daemon on the red-side sends messages periodically, e.g., every twenty to thirty seconds, to refresh the TC filter data. If there is no traffic through the filter for a predetermined interval, e.g., 100 seconds, the QoS Service Provider module 80 assumes that the red-side RSVP session has been closed and terminates the RSVP session by generating a message for a path tear for the black-side RSVP session.

The QoS Service Provider module 80 is configured to dynamically adjust the bandwidth reserved for an aggregated RSVP flow through the black network based on the amount of RSVP traffic coming from the red network for that particular RSVP flow. The QoS Service Provider module 80 defines an aggregated RSVP increment as a percentage of the rate assigned to the differentiated services class reserved for RSVP through the black network. This percentage may be a function of the array size,—e.g., ten percent increments for an array size of ten—but the aggregated RSVP increment can be set to a different value in the QoS Service Provider's configuration file. The aggregated RSVP session is initially created with a flow rate of that percentage. The QoS Service Provider module 80 adjusts the bandwidth reserved for the aggregated RSVP flow up or down by that increment.

The QoS Service Provider module 80 gathers statistics at predetermined intervals. The QoS Service Provider module 80 maintains a list of aggregated RSVP flows and checks the policies for those flows. If there are any over-limit packets in an aggregated flow, the QoS Service Provider module 80 requests the RSVP daemon to increase the bandwidth for that flow by one increment. If the aggregated flow rate is below the current assigned rate minus the increment, the QoS Service Provider module 80 requests the RSVP daemon to decrease the bandwidth for that aggregated flow by one increment. If the aggregated flow is zero, the QoS Service Provider module 80 requests the RSVP daemon to decrease the bandwidth for that flow to the lowest level, if it is not already at the lowest level. If the aggregated flow remains at zero for a configurable amount of time, the QoS Service Provider module 80 removes the RSVP session.

The QoS Service Provider module 80 saves the information for the current reservation. Thus, should a request to resize the bandwidth fail, the QoS Service Provider module 80 reverts back to the last successful reservation configuration. Specifically, when the QoS Service Provider module 80 on a black router receives the first PATH message from another black router for an aggregated RSVP session, it saves the information from that message and requests a reservation. The reservation request by the receiving black router results in the generation of the RESV message hop by hop (i.e., node by node) back to the source.

Whenever the QoS Service Provider module 80 receives another PATH message for that session requesting an increased rate, the QoS Service Provider module 80 copies the information from the last reservation and saves the information from the current message. The QoS Service Provider module 80 saves only the last successful PATH request and the current PATH request. The QoS Service Provider module 80 then generates a new RESV message. If this message results in an error message, the QoS Service Provider module 80 reissues a reservation request for the same rate as the previous successful reservation.

The execution of a test application using an exemplary embodiment of the present invention is described in FIG. 7 as follows. The QoS Service Provider module 80 and the RSVP daemon (RSVPD) are initialized on all red clients and black routers, with the configuration files appropriate for their positions in the network. Two server applications are started on red client 114; an RSVP receive application that tells the RSVPD which interface, port and protocol parameters to use for the RSVP sessions, and a network server that detects (and optionally, prints) the parameters specified by the RSVP receive application. These two programs may alternately be combined into a single application.

A test client on red client 102 sends a predetermined number of packets to red client 114. The client first sets the field in the QoS_info structure to INTSERV and calls the QSocket function for protocol SOCK_DGRAM. When QConnect is called, the QOSAPI sends this information to the QoS Service Provider. Since the QoS infostructure field is set to INTSERV, the QoS Service Provider module 80 requests an RSVP session from the RSVPD. The RSVPD responds by sending an RSVP_PATH message to red client 114. As it is leaving red client 102, the packet DSCP is set to AF42. The packet is forwarded to HAIPE device 104. Since the packet header source and destination information indicate that the packet is being transmitted from red network 102 to red network 114, the ingress HAIPE device 104 establishes an IPSec tunnel between itself and egress HAIPE device 112. Once the tunnel is established, ingress HAIPE device 104 encrypts the RSVP_PATH message in an ESP packet and forwards it to black router 106. The DSCP value in the RSVP_PATH message is copied to the ESP packet IP header. The kernel of black router 106 detects that a packet from HAIPE device 104 having DSCP set to AF42 is being forwarded to its black-network interface and informs the QoS Service Provider module 80. In response to this notification, the QoS Service Provider module 80 scans the black-router-to-HAIPE-device table to determine the black router addresses that are connected to the source and destination IP addresses in the ESP packet. The QoS Service Provider module 80 uses the addresses to request, through the RSVP API, an RSVP session between black router 106 and black router 110. The RSVPD initiates an RSVP_PATH message to black router 110, port 9999, and ESP protocol. Since the QoS Service Provider module 80 on black router 110 has started a receive API with those parameters, the RSVPD forwards the RSVP_PATH message to the QoS Service Provider. The QoS Service Provider module 80 requests an RSVP_RESV message to be sent hop-by-hop back to black router 106. When the RSVPD on black router 108 receives the RSVP_RESV message, it requests the scheduler for admission. The scheduler sends the request to the QoS Service Provider. If it has not allocated all of the bandwidth reserved for AF4, the scheduler allows admission, by responding to the QoS Service Provider module 80 with a filter request. Since the destination port is 9999, the QoS Service Provider module 80 identifies the filter request as one for aggregated RSVP characteristics, so the QoS Service Provider module 80 references the black-router-to-HAIPE-device table to retrieve the IP address that will be in the ESP packet in order to create the filter (TC U32). U32 classifiers provide based on the destination IP address, destination TCP/UDP port, source IP address, source TCP/UDP port, TOS (or DiffServ) byte and protocol. This filter is created in the DiffServ marking queue DSMARK qdisc and maps the ESP packets from ingress HAIPE device 104 to egress HAIPE device 112 into AF42. The RSVP_RESV message is then sent to black router 106, where the same procedure occurs. Since this is the originating node the RESV event is returned to the QoS Service Provider module 80, which is thereby notified that the aggregated RSVP session is established. QoS Service Provider module 80 begins monitoring the packets going through the newly created filter.

The ESP packet meanwhile has arrived at HAIPE device 112. HAIPE device 112 decrypts the ESP packet and sends it to red client 114. The RSVPD on red client 114 sends the ESP packet to the RSVP receive API application, which requests a reservation from the RSVPD. The RSVPD initiates an RSVP_RESV message to red client 102, which is forwarded from red client 102 across the network to HAIPE device 112. HAIPE device 112 encrypts the packet and sends the packet out of the secure area. The packet then flows back through the black routers and goes to HAIPE device 104, which decrypts and sends it to red client 102. The RSVPD on red client 102 will ask the QoS Service Provider module 80 for admission. If admitted, a filter request is sent to the QoS Service Provider module, which creates a filter in the DSMARK qdisc for AF4 in order to map the packets for this flow into AF41 (see, e.g., FIG. 6). Since this is the originating node for the red RSVP session, the QOSAPI is notified that the RESV was received and it sets up a filter in the packet scheduler (HTB qdisc) to map this flow to the DSMARK qdisc for AF4.

Now, when the application on red client 102 begins to send its packets, the filter in the HTB qdisc sends this packet to the DSMARK qdisc for AF4. As long as the flow stays within the original flow spec request, the filter in the DSMARK qdisc marks the packets with the DSCP for AF41. When the packets reach HAIPE device 104, they are encrypted in ESP packets and sent to black router 106. On black router 106, since the DSCP is set to AF41, the packets are sent to the DSMARK qdisc for AF4, where the filter for that flow will again mark the DSCP as AF41, as long as the flow stays within the original flow spec request. The packets flow through the black network with a DSCP of AF41 as long as the flow stays within the original flow spec request. When they reach HAIPE device 112, they are decrypted and sent to red client 102 and eventually to the test server application that was started earlier.

Meanwhile, the QoS Service Provider module 80 on black router 106 is monitoring the flow through the filter for that flow in the DSMARK qdisc for AF4. If there are no packets through that filter for 100 seconds, the QoS Service Provider module 80 requests to release the aggregated RSVP session, which results in the RSVPD sending an RSVP_PATH_TEAR message to black router 110 and all allocations and filters are released along the black network. The QoS Service Provider module 80 on black router 106 resets the monitoring in the kernel for DSCP of AF41, AF42, and AF43 from HAIPE device 104.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for enabling Quality of Service (QoS) characteristics for transmitting encrypted data packets across a shared transit network comprising:
    a plurality of secured network enclaves coupled by a network, the plurality of secured network enclaves having a first security level and the network having a second security level different from the first security level;
    a cryptographic boundary separating each secured network enclave and the network;
        a crypto device disposed along the cryptographic boundary of each secured network enclave the crypto device being configured to permit data communication between the network and the secured network enclave;
    means for mapping at least one integrated services request to at least one packet forwarding classification in a packet to be forwarded by a software application in a secured network enclave;
        each crypto device including an encryption/decryption means for encrypting and decrypting a data flow, a classification monitoring module and a service provider module;
    the classification monitoring module includes detecting means for identifying the at least one packet forwarding classification mapped to the at least one integrated services request in a data flow from a first software application within a first secured network enclave and notifying means for notifying the service provider module of the receipt of the at least one integrated services request by the monitoring module, and the service provider module being configured for communicating at least one path reservation request associated with the at least one integrated services request across the network; for generating at least one reserved path across the second-level network in response to the at least one integrated services request; and for transmitting at least one data flow to at least one peer software application in a second secured network enclave from the first software application in response to generating at least one reserved path across the network.

2. The system as set forth in claim 1, wherein the service provider module also includes flow monitoring means for monitoring the at least one data flow for compliance with at least one policy associated with the at least one path reservation request.

3. The system as set forth in claim 1, wherein the service provider module also includes means for terminating the data flow in response to a predetermined interval of substantially no transmission of the data flow from the first software application.

4. The system as set forth in claim 1, wherein the classification monitoring module provides the service provider module with a plurality of data fields comprising a DSCP value, source IP address and destination IP address, when IntServ notifying means signals the service provider module of the receipt by the classification monitoring module of the at least one IntServ request.

5. The system as set forth in claim 1, wherein the at least one packet forwarding classification is AF4.

6. The system as set forth in claim 1, wherein also comprising means for notifying the first software application of traffic congestion associated with the at least one peer software application receiving the at least one data flow.

7. The system as set forth in claim 6, wherein the means for notifying the first software application includes transmitting an explicit congestion notification (ECN) signal from the peer software application to the first software application.

8. The system as set forth in claim 1, wherein the service provider module generates a plurality of reserved paths in response to a plurality of IntServ request notifications being received from the monitoring module.

9. The system as set forth in claim 8, wherein the at least one data flow is characterized by a plurality of predefined data flow parameters and the service provider module further includes means for reconfiguring the plurality of reserved paths while monitoring a plurality of data flows, in response to the flow monitoring means detecting a change in at least one of the plurality of data flow parameters.

10. The system as set forth in claim 9, wherein the reconfiguring of the plurality of reserved paths is based on an iteration interval, and the iteration interval is configurable.

11. The system as set forth in claim 10, wherein the iteration interval is dynamically configurable.

12. The system as set forth in claim 10, wherein the iteration interval is statically configurable.

13. The system as set forth in claim 10, wherein the iteration interval is between 30 seconds and three minutes.

14. The system as set forth in claim 8, wherein the plurality of reserved paths is selected from forwarding classes AF1, AF2, AF3, AF4 and combinations thereof.

15. The system as set forth in claim 9, wherein the reconfigured parameter of the reserved paths is bandwidth, and the bandwidth that is configured for each of the forwarding classes is based on a percentage of the aggregated plurality of data flows that each forwarding class is using.

16. The system as set forth in claim 15, wherein a percentage of the total bandwidth is also reserved for control signaling.

17. The system as set forth in claim 9, wherein reconfiguring the reserved paths also includes sharing a portion of the bandwidth of the aggregated reserved paths for one data flow of the plurality of data flows, with a portion of bandwidth allocated for at least one other data flow of the plurality of data flows, in response to at least one data flow of the plurality of data flows exceeding the allocated bandwidth for the associated data flow.

18. The system as set forth in claim 17, wherein said sharing of bandwidth is limited to a predetermined time interval.

19. The system as set forth in claim 18, wherein after the predetermined interval, the service provider module is configured to negotiate across the network to establish a new path reservation in response to the aggregated plurality of data flow paths exceeding the parameters of the original data flows for at least two predetermined intervals.

20. The system as set forth in claim 19, wherein the service provider module is configured to revert to the previous network path in response to failing to establish a new path reservation.

21. The system as set forth in claim 1, wherein the second level network including a plurality of nodes, the nodes being comprised of a combination of QoS enabled devices and QoS nonenabled devices, wherein the QoS enabled devices are configured to communicate path reservation information to other QoS enabled devices, and QoS nonenabled devices being configured to forward packets in the data flow in accordance with the forwarding classification.

22. The system as set forth in claim 21, wherein QoS enabled devices include a data table containing parameters associated with the network path reservation established by the QoS provider module.

* * * * *

UNITED STATES PATENT AND TRADEMARK OFFICE
CERTIFICATE OF CORRECTION

PATENT NO. : 7,623,458 B2
APPLICATION NO. : 11/241207
DATED : November 24, 2009
INVENTOR(S) : Ayyagari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 977 days.

Signed and Sealed this

Twenty-sixth Day of October, 2010

David J. Kappos
*Director of the United States Patent and Trademark Office*